Jan. 8, 1946.  J. K. WEBB  2,392,790
ELECTRICAL TRANSFORMER AND COIL
Filed Sept. 9, 1942
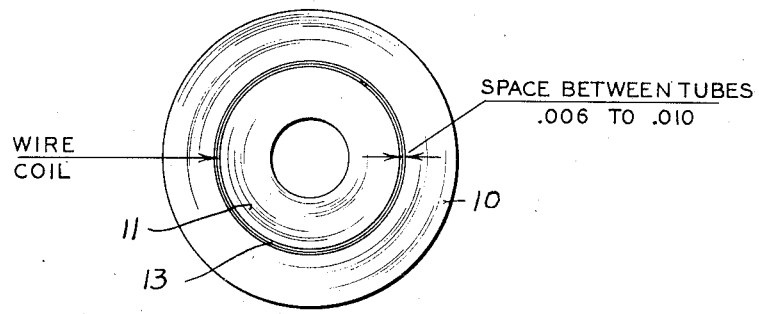
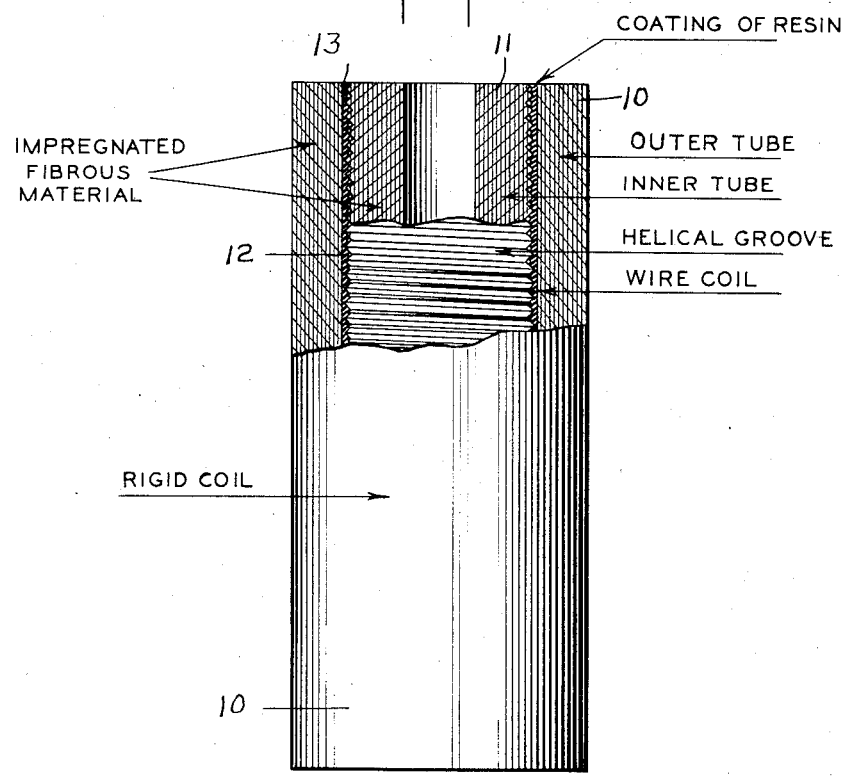
INVENTOR
JOHN KRAUSS WEBB
BY
ATTORNEY Patented Jan. 8, 1946

2,392,790

UNITED STATES PATENT OFFICE 2,392,790

ELECTRICAL TRANSFORMER AND COIL

John Krauss Webb, London, England, assignor to International Standard Electric Corporation, New York, N. Y.

Application September 9, 1942, Serial No. 457,747
In Great Britain October 3, 1941

19 Claims. (Cl. 175—21)

This invention relates to the manufacture of electrical coil and like assemblies such as inductors, transformers and condenser cones.

An object of the invention is to facilitate the building up from preformed components of a rigid coil or like assembly which may include delicate coils of fine wire firmly embedded in a high quality insulation and accurately located to within fine limits of predetermined dimensions, the electrical breakdown value between turns or coils being of a very high order.

Fig. 1 is a plan view of a rigid coil formed in accordance with my invention; and Fig. 2 is a side elevation partly in section of the coil of Fig. 1.

In application Serial No. 401,774 filed July 10, 1941, there is described a convenient method of making a rigid coil assembly by hot rolling a strip of paper carrying a synthetic resin into a tube or former, cutting a helical groove in the peripheral surface of the tube, winding the coil of wire into this groove, and then covering the coil by hot rolling further layers of paper directly thereon. This method, although in general a very convenient one, may sometimes be found to suffer from disadvantages. Thus, for example, where the winding consists of very fine wire, the process of covering with the outer layers of paper may be too severe and the heavy pressures involved in the hot rolling may cause distortion of the winding. Again, as a matter of engineering practice, one is more or less restricted to making the complete device in a single continuous series of operations, without having much latitude in respect of time or place in arranging the successive operations. It was also found very difficult to deal with the lead out wires forming the connection to the coils.

The present invention offers an improved method of manufacture whereby the most delicate coils may be made with accuracy and whereby the devices can be assembled when and where desired, from preformed components, the resulting assembly being characterised by great mechanical rigidity, permanence, and high electrical breakdown value between turns or coils.

In accordance with this invention, a rigid coil assembly such as that of Figs. 1 and 2 is manufactured from preformed tubes 10 and 11 of fibrous material impregnated at least superficially with a polymerised resin by inserting a smaller tube 11 upon which a coil 12 is wound into a larger tube 10 after coating the mating surfaces with the resin in monomeric form 13, the liquid monomer acting as a solvent for the polymer in the fibrous former and itself then polymerising to form a rigid bond. The resin is preferably styrene and the tubes may be wound from lengths of styrenated paper, in any of the ways described in application Serial No. 425,244, filed December 31, 1941. The cement of monomeric styrene with which the mating surfaces are painted may be thickened by the addition of polystyrene, and the proportions of 40% monomer to 60% polymer has been found suitable. The internal diameter of the outer tube 10 should be from .006″ to .010″ larger than the external diameter of the inner tube 11 (as indicated in Fig. 1), and these limits have been found to allow of easy and effective assembly. After cementing the tubes together, they are baked in an oven at a temperature of about 70° C. for a day or so, and although this does not complete the polymerisation of the cement, the monomeric component diffuses into the polymer in the fibre or paper of the tubes to such an extent that effective adhesion results.

The ends of the coils may be passed through bushings of polymerised material similar to that used for the tubes on which the coils are wound and cemented thereto in a like manner.

Tests made indicate that the cemented gap between tubes has an electric strength of about 50 kv. per inch in a longitudinal direction along the cemented surfaces.

A very convenient method is thus provided for the manufacture of complete transformers by the assembly of preformed components. In the case, for instance, of simple transformers, consisting of a primary coil and a secondary coil arranged one within the other, the inner tube with its coil, the middle tube with its coil, and the outer tube constituting a cover, are all preformed, so that assembly is simply a matter of fitting the three parts one within the other, with coatings of styrene cement between them. The polymerisation may be hastened by baking.

Again, condenser bushings of the "condenser cone" type have been successfully manufactured for many years past using oil impregnated paper as the main insulant. See for example patent application Serial No. 596,724, filed March 4, 1932 now Patent No. 1,935,820. Attempts have recently been made to use instead styrenated paper bonded by hot rolling, in order to provide a high quality insulant which would also serve as a barrier to oil flow. By this means a barrier termination may be formed, as described by T. R. Scott and J. K. Webb in "Electrical Communication" October 1940 ("The Application of Styrene to H. T. Cable Systems"—Part IV).

Certain difficulties in the manufacture of such bushings have become evident.

The main difficulty has been due to distortion occurring in the bush after hot rolling and cooling. This is apparently due to the differential contraction of the polystyrene and the paper fibres, the former being considerably greater than the latter. The effect of this is that, on cooling, the paper with the included metal foils is warped, and ridges are formed along its length. This has a very deleterious effect on the quality of the bushing.

The tendency to distort becomes more marked as the radial thickness of the bush is increased. The difficulty of removing the bush from the mandrel on which it is wound likewise increases with increasing dimensions and is at times insuperable.

The insertion of the foils during winding requires considerable skill and it is very difficult to secure their correct alignment. Polystyrene, being a thermo-plastic, softens at the rolling temperature of about 250° C. to the consistency of a thick bitumen, and a certain quantity is pressed out of the paper to form a wave against which it almost impossible to introduce the foil without releasing the pressure. This in turn is objectionable, as it allows the wave of styrene to recede and suddenly enter the bush.

The present invention can be made use of to overcome these troubles, the completed bush being formed by telescoping together and cementing a series of separately wound bushes each of radial dimensions sufficiently small to avoid the above troubles.

Each bush is in turn machined on its outer surface until the diameter is about .006" below that of the internal diameter of the next bush in the series into which it fits. It has been found that there is no need to machine the internal diameters as these accurately retain the dimensions of the mandrels on which they are wound. The latter can, of course, be ground parallel to within very fine limits, and the above clearances permit of easy assembly.

A suitable cement is composed of a solution of 60 parts of polystyrene in 40 parts of monostyrene, and the latter may be polymerised after cementing by baking the bushing.

The metal foils may be conveniently located on the surface of each tube before telescoping and cementing, and in this connection it is advantageous to machine out a recess of depth slightly greater than that of the foil (say .002"). This obviates the tendency of the foils to pucker as the tubes are telescoped and also helps in their accurate positioning.

The foil used is preferably made of .0005" thick aluminium backed with paper of thickness .001" and closely perforated with a series of $\frac{1}{16}$" diameter holes. Such perforations, while not affecting the electrical requirements, permit of interbonding of the tubes through the foil, thus increasing the resistance of shearing.

The radial spacing of the foils is about .05" and each tube consequently increases by the increment 0.1" in diameter.

Other advantages accruing from this method of construction are that the separate tubes may be readily and quickly vacuum dried to a low power factor before cementing, whereas before it was virtually impossible to dry a completed bush to give a reasonably good power factor, on account of the great radial thickness, and reliance had to be placed on the pre-drying of the paper and its maintenance in this condition up to the time of winding. Furthermore, each separate bush may be electrically tested before assembly and defective ones rejected.

Each former need not be the full length of the cone, but may become progressively shorter as the diameter increases. The final contour may be achieved by machining after assembly and cementing.

This method of construction is, of course, applicable to any form of condenser bushing.

In order to eliminate voids in the completed bushing which might lead to a poor ionisation factor, it is heated to a temperature of about 100° C. before machining, in vacuo, impregnated with monostyrene which has been thickened somewhat by dissolving some polystyrene therein and subjected to an hydraulic pressure of about 2 tons/sq. inch during cooling to room temperature.

The bushing may then be machined to its final form and fitted with a metal end cap, and after surface lacquering, is ready for service.

What is claimed is:

1. The manufacture of a rigid electrical coil or like assembly from preformed members of fibrous material impregnated at least superficially with a polymerized resin, which includes the steps of winding a coil upon a smaller preformed member, coating the coil and external surface of the member with a resin in monomeric form, coating the internal surface of a larger preformed member with a resin in monomeric form, and inserting the smaller member into the larger.

2. The method according to claim 1, in which the resin is styrene.

3. The manufacture of a rigid electrical coil or like assembly from preformed members of fibrous material impregnated at least superficially with a polymerized resin, which includes the steps of winding a coil upon a smaller preformed member, coating the coil and external surface of the member with a cement comprising monomeric styrene thickened by the addition of polystyrene, coating the internal surface of a larger preformed member with a cement comprising monomeric styrene thickened by the addition of polystyrene, and inserting the smaller member into the larger.

4. The method according to claim 3, in which the cement has proportions of 40% monomeric styrene and 60% polystyrene.

5. The manufacture of a rigid electrical coil or like assembly from preformed tubes of fibrous material impregnated at least superficially with a polymerized resin, which includes the steps of winding a coil or like electrical element upon the external surface of a smaller tube, coating the external surface of the larger tube with the same resin in monomeric form, and inserting the smaller tube with its coil into a larger.

6. The manufacture of a rigid electrical coil or like assembly from preformed members of fibrous material impregnated at least superficially with a polymerized resin, which includes the steps of winding a coil on the external surface of a smaller member, coating the coil and external surface of said smaller member with a material which acts as a solvent for a polymer, and subsequently sets to form a rigid bond, coating the internal surface of the larger member with the same material, and thereafter inserting the smaller member with its coil into the larger member.

7. The manufacture of a rigid electrical coil or like assembly from preformed tubes of fibrous material impregnated at least superficially with a polymerized resin, which includes the steps of winding an electrical coil or like element upon the external surface of a smaller tube, coating the coil and external surface of the smaller tube with a material which acts as a solvent for the polymer and subsequently sets to form a rigid bond, coating the internal surface of a larger tube with the same material and thereafter inserting the smaller into the larger tube.

8. The method according to claim 7, which includes the further step of baking the assembly at a temperature of approximately 70° C. for about one day.

9. The method of making a rigid electrical coil or like assembly, which includes the steps of forming a smaller and a larger member of fibrous material, impregnating said members at least superficially with a polymerized resin, winding a coil upon the smaller member, coating the coil and external surface of the smaller member with the resin in monomeric form, coating the internal surface of the larger member with the resin in monomeric form, and inserting the smaller member into the larger.

10. The manufacture of a rigid electrical coil or like assembly, which comprises the steps of winding a smaller member and a larger member from lengths of paper impregnated with a polymerized resin, winding a coil upon the smaller member, coating the coil and external surface of the member with the resin in monomeric form, coating the internal surface of the larger member with the resin in monomeric form, and inserting the smaller member into the larger.

11. The manufacture of a rigid electrical coil or like assembly, which comprises forming a smaller tube and a larger tube of fibrous material, impregnating said material at least superficially with a polymerized resin, winding a coil or like electrical element upon the external surface of the smaller tube, coating the external surface of the coil and tube with the resin in monomeric form, coating the internal surface of the larger tube with the same resin in monomeric form, and inserting the smaller tube with its coil into the larger.

12. The manufacture of a rigid electrical coil or like assembly, which comprises winding a smaller tube and a larger tube from lengths of paper impregnated at least superficially with a polymerized resin, winding a coil or like electrical element upon the external surface of the smaller tube, coating the external surface of the coil and tube with the resin in monomeric form, coating the internal surface of the larger tube with the same resin in monomeric form, and inserting the smaller tube with its coil into the larger.

13. The manufacture of a rigid electrical coil or like assembly which comprises forming a smaller member and a larger member of fibrous material, impregnating said members at least superficially with a polymerized resin, winding a coil on the external surface of the smaller member, coating the coil and external surface of said smaller member with a material which acts as a solvent for the polymerized resin, and subsequently sets to form a rigid bond, coating the internal surface of the larger member with the same material, and thereafter inserting the smaller member with its coil into the larger member.

14. The manufacture of a rigid electrical coil or like assembly which comprises winding a smaller member and a larger member from lengths of paper impregnated at least superficially with a polymerized resin, winding a coil on the external surface of the smaller member, coating the coil and external surface of said smaller member with a material which acts as a solvent for the polymerized resin, and subsequently sets to form a rigid bond, coating the internal surface of the larger member with the same material, and thereafter inserting the smaller member with its coil into the larger member.

15. The manufacture of a rigid electrical coil or like assembly which comprises forming a smaller tube and a larger tube of fibrous material, impregnating said tubes at least superficially with a polymerized resin, winding an electrical coil or like element upon the external surface of the smaller tube, coating the coil and external surface of the smaller tube with a material which acts as a solvent for the polymerized resin and subsequently sets to form a rigid bond, coating the internal surface of the larger tube with the same material and thereafter inserting the smaller into the larger tube.

16. The manufacture of a rigid electrical coil or like assembly, which comprises winding a smaller and a larger tube from lengths of paper impregnated at least superficially with a polymerized resin, winding an electrical coil or like element upon the external surface of the smaller tube, coating the coil and external surface of said smaller member with a material which acts as a solvent for the polymerized resin, and subsequently sets to form a rigid bond, coating the internal surface of the larger member with the same material, and thereafter inserting the smaller member with its coil into the larger member.

17. A manufacture as claimed in claim 5, in which the resin is styrene.

18. A manufacture as claimed in claim 6, in which the resin is styrene.

19. A manufacture as claimed in claim 7, in which the resin is styrene.

JOHN KRAUSS WEBB.